US012312118B2

(12) United States Patent
Hoepner et al.

(10) Patent No.: US 12,312,118 B2
(45) Date of Patent: May 27, 2025

(54) THERMOFORMING PACKAGING MACHINE WITH TRANSVERSE CUTTING STATION AND METHOD FOR OPERATING A THERMOFORMING PACKAGING MACHINE COMPRISING A TRANSVERSE CUTTING STATION

(71) Applicant: MULTIVAC SEPP HAGGENMUELLER SE & CO. KG, Wolfertschwenden (DE)

(72) Inventors: Bernd Hoepner, Kempten (DE); Sebastian Sauter, Breitenbrunn (DE); Herbert Benischke, Memmingen (DE)

(73) Assignee: MULTIVAC Sepp Haggenmueller SE & Co. KG, Wolfertschwenden (DE)

( * ) Notice: Subject to any disclaimer, the term of this patent is extended or adjusted under 35 U.S.C. 154(b) by 28 days.

(21) Appl. No.: 18/113,152

(22) Filed: Feb. 23, 2023

(65) Prior Publication Data

US 2023/0264846 A1 Aug. 24, 2023

(30) Foreign Application Priority Data

Feb. 23, 2022 (DE) ......................... 102022104218.9

(51) Int. Cl.
*B65B 47/04* (2006.01)
*B26D 7/18* (2006.01)
(Continued)

(52) U.S. Cl.
CPC .......... *B65B 61/065* (2013.01); *B26D 7/1854* (2013.01); *B26D 7/1863* (2013.01);
(Continued)

(58) Field of Classification Search
CPC ........... B65B 9/04; B65B 47/04; B65B 57/00; B65B 61/06; B65B 61/065; B26D 7/1854; B26D 7/1863; B26F 1/38
(Continued)

(56) References Cited

U.S. PATENT DOCUMENTS 3,465,625 A * 9/1969 Daly .................... B26D 7/1863 83/100
3,735,654 A * 5/1973 Jurasek ................. B29C 51/445 83/132
(Continued)

FOREIGN PATENT DOCUMENTS

DE 102004008597 B4 * 2/2006 ............. B65B 61/04
DE 10 2006 020 367 A1 8/2007
(Continued)

OTHER PUBLICATIONS

German Search Report Dated Oct. 21, 2022, Application No. 10 2022 104 218.9, Applicant MULTIVAC Sepp Haggenmueller SE & Co. KG, 5 Pages.
(Continued)

*Primary Examiner* — Stephen F. Gerrity
(74) *Attorney, Agent, or Firm* — Brooks Kushman P.C.

(57) ABSTRACT

The disclosure relates to a thermoforming machine comprising a transverse cutting station. The transverse cutting station has a punching device for separating one or more film sections from a lower film and/or an upper film by means of a punching tool comprising a punch and a die. The punching device comprises a chamber configured to at least temporarily receive the film sections, and a suction device to convey the film sections out of the transverse cutting station. The suction device is fluidically connected to a compressed gas source.

22 Claims, 3 Drawing Sheets

(51) Int. Cl.

| | |
|---|---|
| ***B65B 9/04*** | (2006.01) |
| ***B65B 57/00*** | (2006.01) |
| ***B65B 61/06*** | (2006.01) |
| *B26F 1/38* | (2006.01) |

(52) U.S. Cl.
CPC .............. *B65B 47/04* (2013.01); *B65B 57/00* (2013.01); *B26F 1/38* (2013.01); *B65B 9/04* (2013.01)

(58) Field of Classification Search
USPC ........................................ 53/453, 559, 329.5
See application file for complete search history.

(56) References Cited

U.S. PATENT DOCUMENTS

| | | | | | |
|---|---|---|---|---|---|
| 5,022,793 | A * | 6/1991 | Hoshino et al. | B26D 7/1863 406/123 |
| 5,065,469 | A * | 11/1991 | Takken et al. | B26D 7/1863 134/32 |
| 8,752,357 | B2 | 6/2014 | Schiche et al. | |
| 10,472,112 | B2 | 11/2019 | Ehrmann | |

FOREIGN PATENT DOCUMENTS

| | | | | |
|---|---|---|---|---|
| DE | 10 2006 001738 | B3 | 8/2007 | |
| DE | 10 2008 015 691 | B3 | 4/2010 | |
| DE | 10 2011 100 680 | A1 | 11/2012 | |
| DE | 20 2013 006803 | U1 | 8/2013 | |
| EP | 1531031 | A1 * | 5/2005 | B26D 7/1863 |
| EP | 2359993 | A1 * | 8/2011 | B26D 7/1854 |
| EP | 2 447 171 | B1 | 10/2013 | |
| EP | 3 088 315 | A1 | 11/2016 | |
| JP | 2015113185 | A * | 6/2015 | |

OTHER PUBLICATIONS

European Search Report (with English Machine Translation) Dated Aug. 25, 2023, Application No. 23153619.4-1014, Applicant MULTIVAC Sepp Haggenmüller SE & Co. KG, 12 Pages.

* cited by examiner

THERMOFORMING PACKAGING MACHINE WITH TRANSVERSE CUTTING STATION AND METHOD FOR OPERATING A THERMOFORMING PACKAGING MACHINE COMPRISING A TRANSVERSE CUTTING STATION

CROSS REFERENCE TO RELATED APPLICATIONS

This application claims foreign priority benefits under 35 U.S.C. § 119(a)-(d) to German patent application number DE 10 2022 104 218.9, filed Feb. 23, 2022, which is incorporated by reference in its entirety.

TECHNICAL FIELD

The disclosure relates to a thermoforming packaging machine and to a method for operating a thermoforming packaging machine.

BACKGROUND

In thermoforming packaging machines, a trough is usually formed in a lower film in a forming station, a product is inserted into it and the trough is sealed in an airtight manner with an upper film under vacuum and/or modified atmosphere in a sealing station. The packages thus produced are attached to each other as a composite via the lower film and are transported through the thermoforming packaging machine by clamp chains mounted on both sides. A combination of a transverse cutting station and a subsequent longitudinal cutting station can be provided for separating the packages from the composite of the lower and upper film. In the transverse cutting station, the composite of the lower and upper film is cut transversely to the transport direction or, if radii are required at the edges of the packages, strip cuts or so-called star cuts are cut out. In this context, as disclosed for example in EP 3 088 315 A1, the knife can punch out the cutting waste coming from above and the cutting waste falls downwards. If there is not enough space for a system for collecting inside the machine frame or for transporting out of the machine frame, the punching knife can punch out the cutting waste coming from downwards to the top. These are then pushed further upwards in a receiving container after each cut and can then be removed collectively. In high-performance machines, the receiving containers are very tall so that they do not have to be continuously emptied. In this process, the cutting waste is pushed over a shoulder which is located above a film transport plane and on which the last cut cutting waste partially rests with its edge, and thus, it is to be prevented that the cutting waste stacked above it falls downwards into the transverse cutting station or onto the packages to be cut. In the latter case, malfunctions would occur in the thermoforming packaging machine. Especially in the case of thinner or non flexurally-rigid cutting waste, there is a high risk that the weight of the stacked cutting waste cannot be held by the lowest resting cutting waste. A solution to this problem is proposed in EP 2 447 171 B1. By means of a pusher in the transverse cutting station, some of the punching waste is safely carried. This is particularly achieved in the case of strip cuts, but not reliably in the case of star cuts. Another disadvantage is the mechanical configuration of the pusher, which on the one hand is complex and therefore cost-intensive to manufacture, and on the other hand is subject to wear and must be serviced regularly.

In order to remove different geometries of cutting waste, DE 10 2008 015 691 B3 proposes a solution in which the cutting waste is disposed of by means the use of powerful blowers and the routing of the cutting waste via so-called vacuum-suitable spiral hoses. These hoses are on the one hand difficult to clean due to their groove-shaped surface and are therefore undesirable in the food sector, and on the other hand, strip cuts in particular can get caught in these hoses due to their geometry and lead to clogging of the hose. In order to remove the clogging, the operator has to switch off the machine, remove the hose and clean it by hand. This leads to undesired downtime of the entire system.

SUMMARY

An objective of the present disclosure is to provide a device which safely disposes of different cutting waste, such as strip cuts and star cuts, as well as different film types, such as thin, flexurally-rigid films, and thick films. In addition, it is an objective of the present disclosure to provide a wear-free and low-maintenance device, as well as a reliable device with low operating costs. Moreover, it is an objective of the present disclosure to provide a method for the operation of this device.

These objectives may be addressed by a thermoforming packaging machine according to the disclosure, or by a method for its operation.

The thermoforming packaging machine according to the disclosure comprises at least one transverse cutting station, wherein the transverse cutting station comprises a punching device for cutting out one or more film sections from a lower film and/or an upper film by means of a punching tool comprising a punch and a die. In this context, the punching device has a chamber which is configured to receive, at least temporarily, the film sections, and a suction device for conveying film sections out of the transverse cutting station, wherein the suction device is fluidically connected to a compressed gas source. Film sections are sections separated from the lower and/or upper film, which are also generally referred to as cutting waste. These can be so-called strip cuts, star cuts, Euro holes or other sections with geometries.

In a preferred variant of the thermoforming packaging machine according to the disclosure, the suction device is configured as a volume booster into which a compressed gas can be injected by means of a compressed gas source. In a particularly preferred embodiment of the thermoforming packaging machine according to the disclosure, the compressed gas can be injected through an annular gap. In this context, a volume booster is understood to be a pipe arrangement comprising a first and a second pipe, which are arranged coaxially to one another and form a suction channel. The suction channel has an intake side and an outlet side. Between the intake and outlet sides, the pipe arrangement has a thin annular gap through which a gas is introduced at very high velocity. This causes a negative pressure at the intake side of the volume booster and thus entrains gas, for example ambient air, so that an increased volume flow exits at the outlet side. An annular gap can be regarded as an opening or a plurality of openings extending circumferentially around the suction channel. In addition, it is preferred if a pressure regulator is used between the compressed gas source and the suction device in order to be able to set a desired pressure at the suction device. This can serve to limit the pressure applied to the suction device, thereby limiting the operating costs of the suction device and minimizing unwanted noise emissions.

It is particularly preferred if the punching device has a hood forming the chamber, wherein the chamber has at least two openings. It can also be useful if the hood is removably mounted on the punching device in order to be able to easily remove any clogging of the chamber caused by the punching waste by removing the hood.

In a further embodiment of the disclosure, it is conceivable that the first opening is formed by the die. During the cutting process, the punch enters the die to cut or punch out the film. In doing so, the punch almost completely closes the opening of the die. The opening of the die is released again when the punching process is completed and the punch has moved out of the die again. The movement of the punch is often realized via a pneumatic drive. For this, a constant and high pressure is required by the compressed gas source to generate the necessary forces for the cutting process. If several compressed gas consumers are activated at the same time, the pressure of the compressed gas supply may fluctuate depending on the reliability of the compressed gas source. It is therefore expedient that the volume flow generated by the suction device for conveying film sections out of the transverse cutting station is interrupted during the cutting process.

It is preferred that the suction device forms the second opening of the chamber.

The openings are an exit opening through which the film sections are discharged from the chamber and an opening which is configured to ventilate the chamber. It is preferred in this embodiment of the present disclosure that the volume flow generated by the suction device flows from the die through the chamber and through the suction device itself. Thus, the generated cutting waste is reliably conveyed out of the punching device.

It is particularly preferred if the ratio of the cross-section of the chamber, viewed parallel to the transport direction, to the cross-section of the suction device is between 0.5 and 1.5, preferably between 0.5 and 1.2, especially preferably between 0.5 and 1. The ratio of the cross-sections of the suction device and the chamber influences the flow rate of the volume flow. The larger the cross-section of the chamber compared to the cross-section of the suction device, the lower the flow rate within the chamber. It is preferred to achieve a high flow rate in the chamber. It is particularly preferred if the flow rate in the suction device is slightly greater than in the chamber.

In a further development of the disclosure, it is conceivable that a compressed gas connection is present at the end of the chamber opposite the suction device and/or a further opening is present, the opening cross-section of which is preferably adjustable. If film sections are in the form of strip cuts, it is possible that these are only lifted on one side during suction and therefore remain stuck in the die. It may occur that the strip cuts are first lifted out of the die on the side facing the suction device. As a result, a large part of the volume flow is directed at this point. On the side of the die facing away from the suction device, the volume flow may then no longer be sufficient to convey the strip cuts out of the die. Due to the hook shape of the strip cuts, they do not detach from the die in such a case. It is therefore preferred to provide a compressed gas connection on the side of the chamber facing away from the suction device. The discharge of strip cuts can thus be ensured via a volume flow from this compressed gas connection. The further opening can also be formed by an area with a plurality of small openings, such as a grid or a perforated plate. The volume flow can be influenced by adjusting the opening cross-section of this additional opening. A small opening cross-section results in a larger proportion of the volume flow passing through the die and a smaller proportion of the volume flow passing through the additional opening—and vice versa.

One embodiment of the disclosure provides that a deflection device is attached to the suction device, which is configured to direct film sections into a collecting container. Thus, film sections can be conveyed directly out of the transverse cutting station without having to be guided through a hose. On this short path, which the film sections cover during transport, the risk of film sections getting caught and causing clogging is greatly reduced. In addition, the suction device is easy to inspect and, should a clogging occur, easy to clean.

The disclosure also comprises a method of operating a thermoforming packaging machine. The device according to the disclosure is suitable, adapted and configured for carrying out the method. Features described with respect to the device can be transferred to the method and vice versa.

A method according to the disclosure for operating a thermoforming packaging machine comprises a control system and at least one transverse cutting station. The transverse cutting station comprises a punching device for cutting out one or more film sections from a lower film and/or an upper film by means of a punching tool comprising a punch and a die. For this purpose, the method comprises the following steps: at least one film section is cut out of the lower film and/or the upper film by means of the punching tool, the at least one film section is at least temporarily received in a chamber of the punching device, and a volume flow is generated by means of a compressed gas source to convey the at least one film section out of the chamber of the transverse cutting station.

Preferably, an opening of the chamber is released in the method by guiding the punch out of the die. This allows the volume flow generated by the suction device to be directed through the die and thus specifically supports the conveying out of the cutting waste.

In one conceivable embodiment, the volume flow is generated by means of a volume booster by blowing gas, in particular compressed air, into a suction device.

It is particularly convenient if the film section is conveyed through the volume booster.

In a further development of the method, the generation of the volume flow by means of the control system is interrupted at least for the duration of the punching process.

Furthermore, it is preferred if a further volume flow is generated in the method by injecting gas, in particular compressed air, into the chamber.

In a particularly preferred further development of the method, the frequency, duration and/or intensity of the volume flow and/or the further volume flow can be adjusted on the basis of an input by an operator at a man-machine interface and is communicated by means of the man-machine interface to a control system of the thermoforming packaging machine.

BRIEF DESCRIPTION OF THE DRAWINGS

In the following, an embodiment of the disclosure is described in more detail with reference to a drawing.

DETAILED DESCRIPTION

Figure 1:
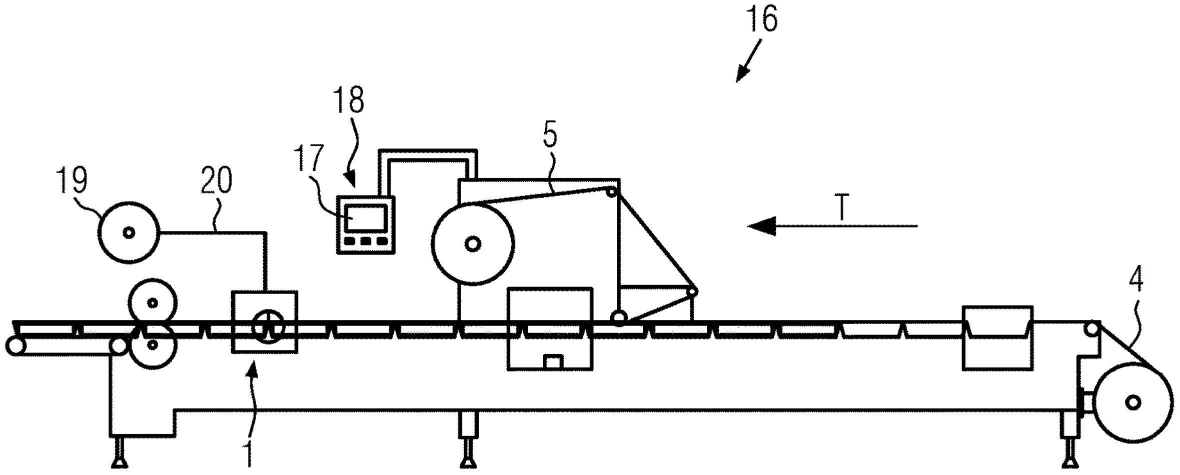
FIG. 1 shows a schematic view of a thermoforming packaging machine.

FIG. 1 schematically shows an embodiment of a thermoforming packaging machine 16 according to the disclosure. A lower film 4 is transported along a transport direction T and is connected to an upper film 5. In a transverse cutting station 1, cuts are made in the lower film 4 and/or the upper film 5. The thermoforming packaging machine 16 according to the disclosure has a man-machine interface 17 and a control system 18. In addition, a compressed gas source 19 is provided, which is connected to at least the transverse cutting station 1 via a compressed gas line 20.

Figure 2:
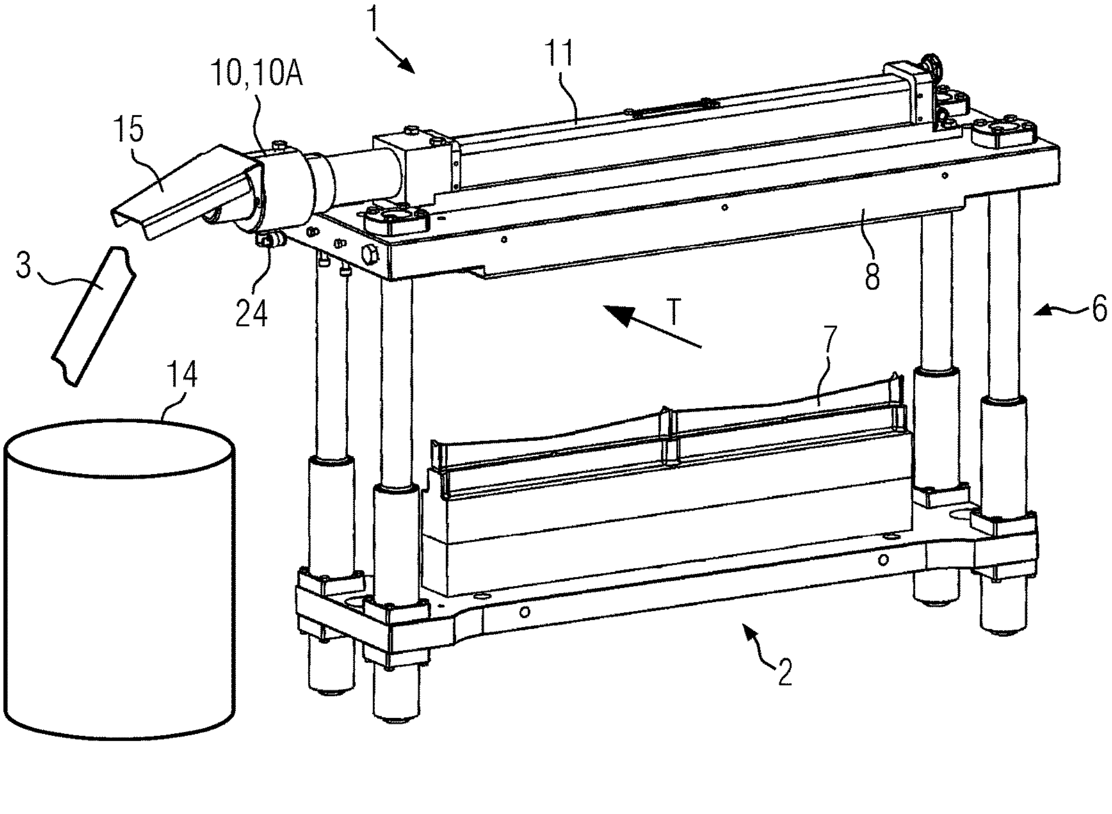
FIG. 2 shows a schematic perspective view of a transverse cutting station.
Figure 3:
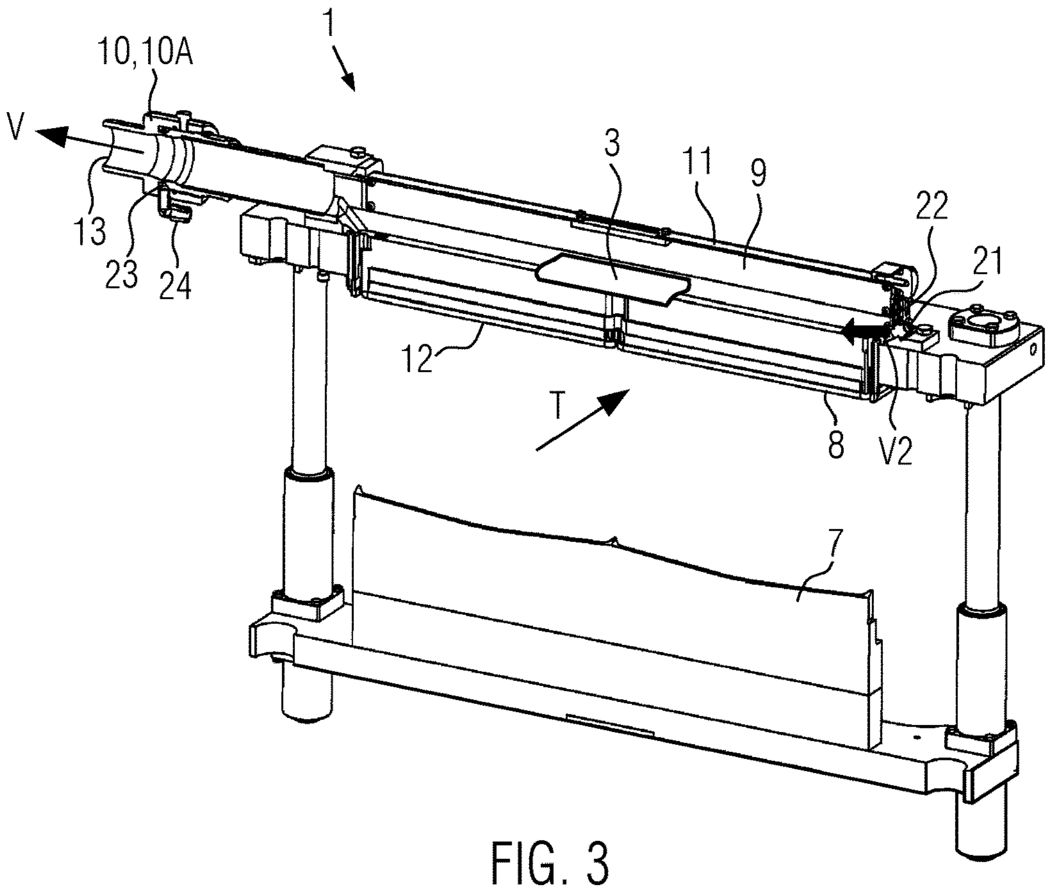
FIG. 3 shows a sectional view of the transverse cutting station transverse to the transport direction.

FIG. 2 shows an embodiment of the transverse cutting station 1 of the thermoforming packaging machine 16 according to the disclosure. A punching device 2 with a punching tool 6 in the open position is shown. A punch 7 is located outside or below a die 8. A hood 11 is attached to the punching device 2. Together with the transverse cutting station 1, the hood 11 forms a chamber 9, as shown in FIG. 3. A suction device 10 is located on the hood 11 and is connected to a deflection device 15. Film sections 3 cut off by the punching tool 2 are conveyed out of the transverse cutting station 1 by the suction device 10 and guided into a collecting container 14 with the aid of the deflection device 15. In the collecting container 14, the cutting waste or film sections 3 are collected. In the variant shown, the suction device 10 is configured as a volume booster 10A. A compressed gas connection 24 can be seen on the volume booster 10A. Via this connection, the volume booster 10A is connected to the compressed gas source 19 through the compressed gas line 20. In the embodiment shown, the suction device 10 is configured as a volume booster 10A with an annular gap 23."

FIG. 3 shows a sectional view of a transverse cutting station transverse to the transport direction T. It can be seen that the hood 11 forms a chamber 9. In the embodiment shown, the chamber 9 of the transverse cutting station 1 has a total of three openings 12, 13 and 22. A film section 3 is located in the chamber 9. It can be transported out of the transverse cutting station 1 through the suction device 10 and thus through the opening 13. This is done by means of a volume flow V, which is generated by the suction device 10. In addition, there is a compressed gas connection 21 at one end of the chamber 9, which can generate a volume flow V2. This volume flow V2 can support the removal of the film sections 3. It is preferred if the volume flow V2 is directed towards the die 8. This specifically supports the removal of film sections 3 in the form of a strip cut, which could get caught in the die 8.

Figure 4:
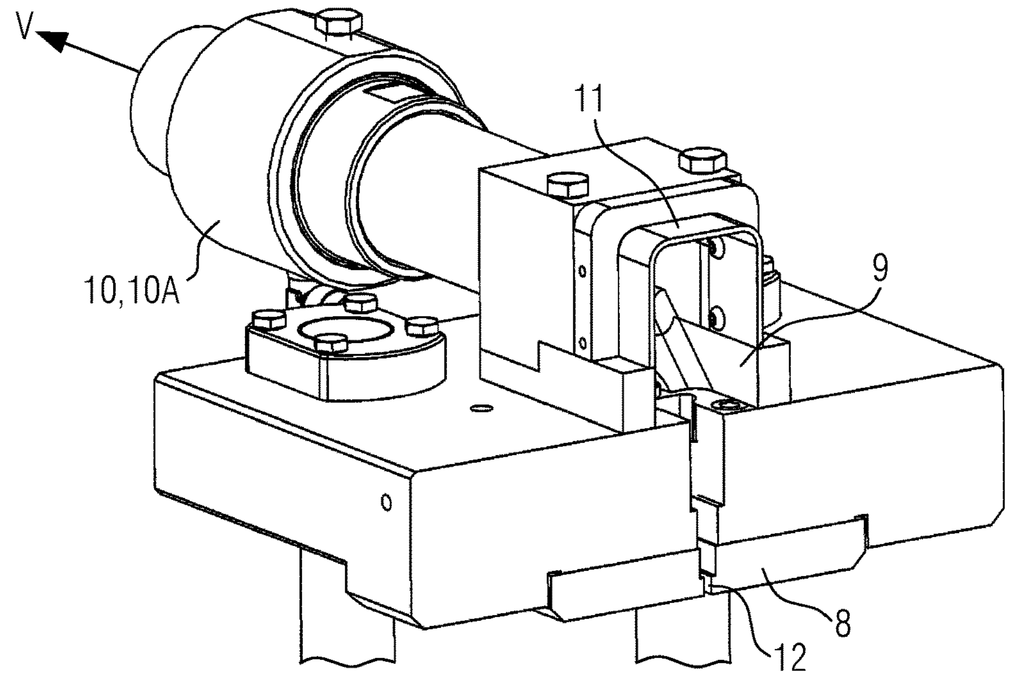
FIG. 4 shows a sectional view of the transverse cutting station parallel to the transport direction.

FIG. 4 shows a sectional view of the transverse cutting station 1 parallel to the transport direction T. In this embodiment, the opening 12 of the die 8 widens towards the top. This reduces the risk of cut film sections 3 becoming caught in the die and causing clogging of the opening 12 with film sections 3.

Figure 5:
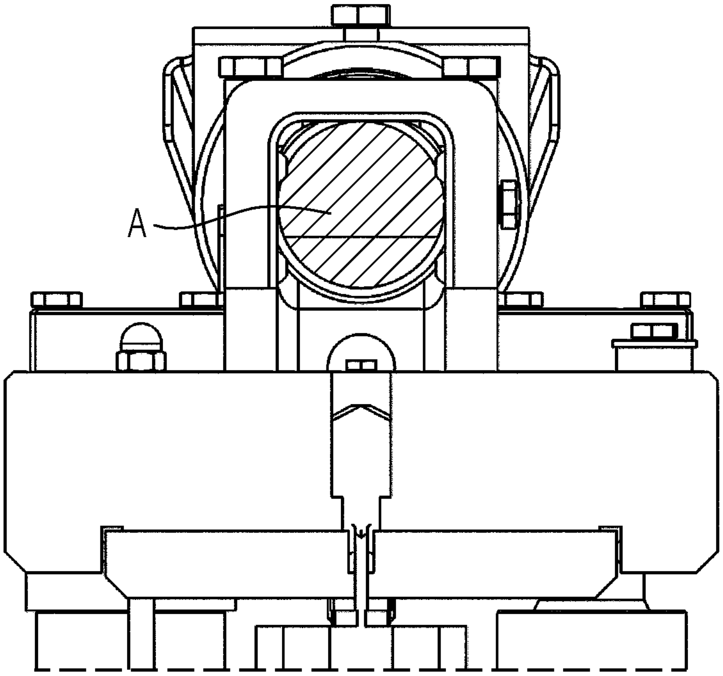
FIG. 5 shows a sectional view of the transverse cutting station parallel to the transport direction.

FIG. 5 shows a sectional view of the transverse cutting station 1 parallel to the transport direction T. The cross-sectional area A of the suction device 10 is shown hatched.

Figure 6:
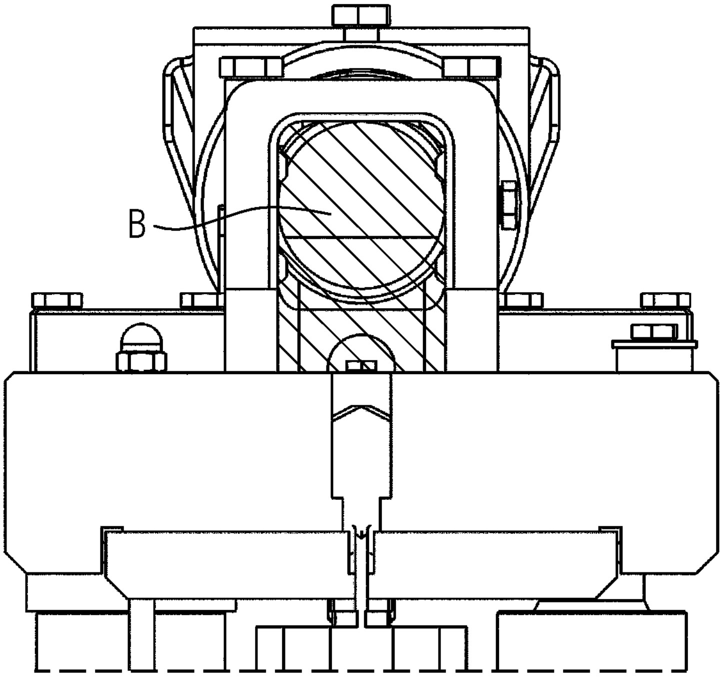
FIG. 6 shows a sectional view of the transverse cutting station parallel to the transport direction.

FIG. 6 shows a sectional view of the transverse cutting station 1 parallel to the transport direction T. The cross-sectional area B of the chamber 9 is shown hatched.

As those skilled in the art will understand, the man-machine interface 17, the control system 18, as well as any other controller, unit, system, subsystem, interface, sensor, device, or the like described herein may individually, collectively, or in any combination comprise appropriate circuitry, such as one or more appropriately programmed processors (e.g., one or more microprocessors including central processing units (CPU)) and associated memory, which may include stored operating system software, firmware, and/or application software executable by the processor(s) for controlling operation thereof and for performing the particular algorithm or algorithms represented by the various methods, functions and/or operations described herein, including interaction between and/or cooperation with each other. One or more of such processors, as well as other circuitry and/or hardware, may be included in a single Application-Specific Integrated Circuitry (ASIC) or Electronic Control Unit (ECU), or several processors and various circuitry and/or hardware may be distributed among several separate components, whether individually packaged or assembled into a System-on-a-Chip (SoC).

LIST OF REFERENCE SIGNS

1 transverse cutting station
2 punching device
3 film section
4 lower film
5 upper film
6 punching tool
7 punch
8 die
9 chamber
10 suction device
10A volume booster
11 hood
12 first opening
13 second opening
14 collecting container
15 deflection device
16 thermoforming packaging machine
17 man-machine interface
18 control system
19 compressed gas source
20 compressed gas line
21 compressed gas connection
22 further opening
23 annular gap
24 compressed gas connection
V, V2 volume flow
T transport direction
A cross-sectional area of the suction device
B cross-sectional area of the chamber

What is claimed is:

1. A thermoforming packaging machine comprising:

a transverse cutting station, wherein the transverse cutting station has a punching device including a punching tool comprising a punch and a die for separating one or more film sections from a lower film and/or an upper film, wherein the punching device comprises a chamber configured to at least temporarily receive the one or more film sections, and a suction device to convey the one or more film sections out of the transverse cutting station, wherein the punching device comprises a hood that forms the chamber with the die, the chamber comprises at least first and second openings, the first opening is formed by the die, and the first opening is configured to receive the punch during a cutting process to separate the one or more film sections from the lower film and/or the upper film; and a compressed gas source fluidically connected to the suction device.

2. The thermoforming packaging machine according to claim 1, wherein the suction device is configured as a volume booster into which a compressed gas can be injected by the compressed gas source.

3. The thermoforming packaging machine according to claim 2, wherein the volume booster defines an annular gap through which the compressed gas is injectable.

4. The thermoforming packaging machine according to claim 1, wherein the suction device forms the second opening of the chamber.

5. The thermoforming packaging machine according to claim 1, wherein a ratio of a cross-section of the chamber, viewed parallel to a transport direction of the thermoforming packaging machine, to a cross-section of the suction device is between 0.5 and 1.5.

6. The thermoforming packaging machine according to claim 5, wherein the ratio is between 0.5 and 1.2.

7. The thermoforming packaging machine according to claim 5, wherein the ratio is between 0.5 and 1.

8. The thermoforming packaging machine according to claim 1, wherein the punching device comprises a compressed gas connection at an end of the chamber opposite the suction device.

9. The thermoforming packaging machine according to claim 1, wherein the chamber comprises an opening at an end of the chamber opposite the suction device.

10. The thermoforming packaging machine according to claim 1, further comprising a deflection device attached to the suction device, wherein the deflection device is configured to direct film sections into a collecting container.

11. The thermoforming packaging machine according to claim 1, wherein the punch is positioned beneath the die.

12. The thermoforming packaging machine according to claim 1, wherein the suction device is configured to generate a volume flow that flows from the die through the chamber and through the suction device.

13. A method for operating a thermoforming packaging machine comprising a transverse cutting station, wherein the transverse cutting station comprises a punching device for cutting out one or more film sections from a lower film and/or an upper film by a punching tool including a punch and a die, the method comprising:

cutting out at least one film section from the lower film and/or the upper film by the punching tool, wherein during the cutting out, the punch enters an opening formed by the die;

at least temporarily receiving the at least one film section in a chamber of the punching device, wherein the opening formed by the die forms a first opening of the chamber; and generating a volume flow by a compressed gas source in order to convey the at least one film section out of the chamber of the transverse cutting station;

wherein the first opening of the chamber is released by guiding the punch out of the die.

14. The method according to claim 13, wherein the volume flow is generated by injecting gas into a volume booster.

15. The method according to claim 14, wherein the at least one film section is conveyed through the volume booster.

16. The method according to claim 13, wherein the generation of the volume flow is interrupted at least for a duration of a punching operation.

17. The method according to claim 13, wherein a further volume flow is generated by injecting gas into the chamber.

18. The method according to claim 17, wherein the gas comprises compressed air.

19. The method according to claim 13, wherein the thermoforming packaging machine comprises a control system, and the method further comprises adjusting frequency, duration and/or intensity of the volume flow based on an input by an operator at a man-machine interface that is communicated to the control system of the thermoforming packaging machine by the man-machine interface.

20. The method according to claim 13, wherein the volume flow generated by the compressed gas source is allowed to be directed through the die when the first opening is released.

21. A method for operating a thermoforming packaging machine comprising a transverse cutting station, wherein the transverse cutting station comprises a punching device for cutting out one or more film sections from a lower film and/or an upper film by a punching tool including a punch and a die, the method comprising:

cutting out at least one film section from the lower film and/or the upper film by the punching tool;

at least temporarily receiving the at least one film section in a chamber of the punching device; and generating a volume flow by a compressed gas source in order to convey the at least one film section out of the chamber of the transverse cutting station, wherein the generation of the volume flow is interrupted at least for a duration of a punching operation.

22. The method according to claim 21, wherein the gas comprises compressed air.

* * * * *